United States Patent Office 3,383,204
Patented May 14, 1968

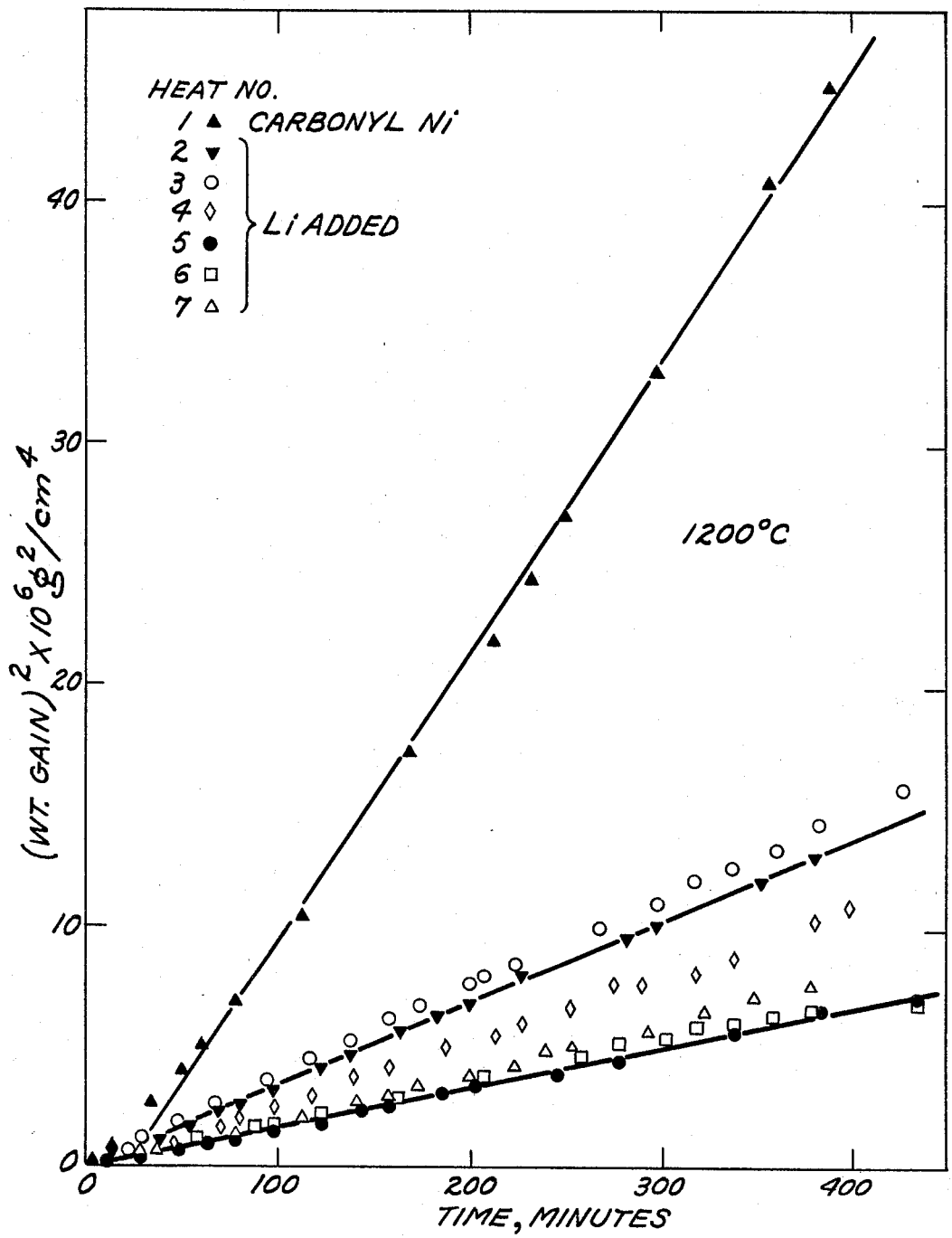

3,383,204
NICKEL-LITHIUM ALLOY PREPARATION
William C. Hagel, Schenectady, N.Y., assignor to General Electric Company, a corporation of New York
Filed Apr. 14, 1965, Ser. No. 448,020
1 Claim. (Cl. 75—170)

ABSTRACT OF THE DISCLOSURE

A method for the preparation of a nickel-lithium (or nickel-base-lithium) alloy having a lithium content ranging from about 0.05 to about 0.14 weight percent of the nickel (or nickel-base) metal comprising providing a molten bath of said metal under one atmosphere of an inert gas, adding lithium metal directly to said molten bath and cooling said molten bath.

---

This invention relates to alloys and methods of forming alloys, and more particularly to nickel-lithium alloys and methods of forming such alloys.

It would be desirable to employ nickel in an oxidizing atmosphere at elevated temperatures. Nickel would provide a desirable electrically conductive material for an electrode in a high temperature fuel cell. However, at elevated temperatures, nickel is subjected to rapid oxidation which renders the metal not suitable for prolonged use as such an electrode. Attempts have been made to reduce the rapid oxidation of nickel in an elevated temperature environment by employing a lithium oxide vapor around the nickel metal. However, in applications where it is desirable to use nickel or a nickel base alloy in an air, oxygen or other oxidizing atmosphere, the application of a lithium oxide vapor is not generally desirable and secondly poses additional problems in the use of such vapor.

The present invention is directed to nickel-lithium alloys and nickel-base-lithium alloys which overcome the above problems of severe oxidation of the material in an oxidizing atmosphere at an elevated temperature. Additionally, the present invention is directed to a method of producing such alloys.

It is an object of my invention to provide an alloy of nickel and lithium.

It is another object of my invention to provide an alloy of a nickel-base metal characterized by forming p-type surface oxides and lithium.

It is another object of my invention to provide a nickel-lithium alloy and a nickel-base-lithium alloy which have superior oxidation resistance at elevated temperatures in oxidizing atmospheres.

It is a further object of my invention to provide an improved method of making such alloys.

In carrying out my invention in one form, an alloy consists of lithium in an amount up to 0.14 weight percent, and the balance being a metal selected from the group consisting of nickel, and nickel-base alloys characterized by forming p-type surface oxides.

These and various other objects, features and advantages of the invention will be better understood from the following description taken in connection with the accompanying drawing in which:

The single figure of the drawing is a graph of continuous weight-gain measurements made on nickel and nickel-lithium alloys at 1200° C. in dry oxygen.

I discovered unexpectedly that very small additions of lithium to nickel increased the oxidation resistance of these alloys. Such additions to nickel-base alloys characterized by forming p-type surface oxides are also desirable to increase their oxidation resistance. I found further that the oxidation resistance was particularly increased when the lithium was present in an amount up to 0.14 weight percent. I found further than in the preparation of these alloys that I obtained about a 10 percent recovery of the lithium into the alloy. Thus, while I added lithium in nominal weight percents from 0.15 to 1.00, these improved alloys had an actual lithium content from less than 0.05 to 0.14 weight percent therein.

Nickel and nickel-base-lithium alloys can be produced by adding the lithium directly to a molten bath of nickel or a nickel-base metal characterized by forming p-type surface oxides. I found that these alloys produced by direct addition of lithium to molten nickel provided greater oxidation resistance than exposure of nickel to a lithium oxide vapor during elevated temperature operation. The parabolic rates of nickel oxidation have been reported to have been decreased by factors of two and four at 1100° C. and 1000° C., respectively, when lithium oxide vapor is present.

While I found that from less than 0.05 weight percent to 0.14 weight percent of lithium provided an addition to a nickel or nickel-base metal characterized by forming p-type surface oxides thereby forming an oxidation resistant alloy, I found further that such an alloy containing from 0.05 weight percent to 0.09 weight percent of lithium appeared to have the optimum amount of this addition.

In the course of my research which led to the discovery of these oxidation resistant alloys, a series of seven cast ingots was prepared. Seven 650 gram heats were prepared by melting carbonyl nickel inductively under one atmosphere of argon. Various amounts of lithium, which are set forth below in Table I, were added to six of these melts by dropping small chunks directly into the melt. I found, as is also set forth in Table I below, that on the average about a 10 percent recovery was achieved with the remainder lost by spattering and volatilization.

Table I below sets forth composition of seven different melts. In this table there is set forth a heat number, the addition of lithium in grams, the nominal weight percent of lithium, the analyzed weight percent of lithium in the alloys, and the calculated atom percent of lithium in these alloys.

TABLE I.—Composition of Nickel-Lithium Alloys

| Heat No. | Li added in grams | Nominal, w/o | Analyzed, w/o | Calc., a/o |
|---|---|---|---|---|
| 1 | 0 | 0 | No trace | 0 |
| 2 | 0.99 | 0.15 | Present, but <0.05 | <0.4 |
| 3 | 1.97 | 0.30 | do | <0.4 |
| 4 | 3.29 | 0.50 | 0.07±0.02 | 0.6 |
| 5 | 4.28 | 0.65 | 0.07±0.02 | 0.6 |
| 6 | 5.26 | 0.80 | 0.12±0.02 | 1.1 |
| 7 | 6.60 | 1.00 | 0.10±0.02 | 0.8 |

After the heats were completed, 1.5 x 1.5 x 0.1 centimeter pieces were machined from the central portion of each of the seven cast ingots for subsequent subjection to chemical analysis, and to oxidation. The chemical analysis provided the data for Table I above. Continuous weight gain measurements were performed in a mullite oxidation chamber employing a quartz spring. The measurements were done at 100° C. intervals from 600° C. to 1300° C. in pure, dry oxygen at 100 millimeters of mercury pressure. All of the pieces for the weight-gain measurements were initially abraded on 400-grit silicon-carbide papers and thoroughly cleaned before bringing up to temperature in a vacuum of $10^{-4}$ millimeters of mercury pressure.

In the single figure of the drawing, there is shown a graph on which is plotted weight-gain$^2$ versus minutes. In the upper left portion of the graph, there are shown the heat numbers, which are identical with the heat numbers set forth in Table I. Each number has an identification symbol which appears on the graph. Representative results are shown for a series of weight-gain measurements at 1200° C. under the above conditions. It will be seen from the graph that the parabolic rate constant ($k_p$) for Heat No. 5, containing 0.07±0.02 analyzed weight percent of lithium is $2.75 \times 10^{-10}$g.$^2$cm.$^{-4}$sec.$^{-1}$. It will be further noted that Heat No. 1, which is carbonyl nickel, has a parabolic rate constant ($k_p$) which equals $$2.00 \times 10^{-9} \text{g.}^2\text{cm.}^{-4}\text{sec.}^{-1}$$

Thus, the oxidation rate between Heat No. 5 and Heat No. 1 has been decreased by a factor of 7. In Heat No. 2, for example, where the analyzed weight percent is less than 0.05 of lithium, the parabolic rate constant of $$5.65 \times 10^{-10} \text{g.}^2\text{cm.}^{-4}\text{sec.}^{-1}$$

provides a rate-reduction factor of 3.5. Similar decreases were found throughout the other temperature ranges for weight-gain measurements, with Heat No. 5 appearing to possess the optimum amount of lithium. At 1100° C. and 1000° C., the alloy set forth in Table I for Heat No. 5 displayed oxidation rates which were slower than those for carbonyl nickel by factors of 5 and 10 respectively. It appears further than heats containing more lithium than Heat No. 5 did not provide further improvement.

Thus, the alloys of my present invention show substantial oxidation resistance over nickel, and over nickel which has been exposed to a lithium oxide vapor during employment of the nickel at elevated temperatures.

While other modifications of this invention and variations of method which may be employed within the scope of the invention have not been described, the invention is intended to include all such as may be embraced within the following claim.

What I claim as new and desire to secure by Letters Patent of the United States is:

1. A method for forming a nickel-lithium or nickel-base-lithium alloy having a lithium content ranging from about 0.05 to about 0.14 weight percent of the respective nickel or nickel base metal comprising the steps of:
 (a) heating to the molten state metal selected from the group consisting of nickel and nickel base alloys under one atmosphere of an inert gas,
 (b) adding directly to the molten metal an amount of lithium metal ranging from about 0.15 to about 1.00 percent of the weight of molten metal and
 (c) cooling said metal with that portion of the lithium addition remaining therein.

References Cited
UNITED STATES PATENTS

| | | | |
|---|---|---|---|
| 3,135,603 | 6/1964 | Wlodek | 75—170 |
| 1,847,044 | 2/1932 | Burkhardt | 75—170 |
| 1,869,499 | 8/1932 | Osborg | 75—82 |
| 1,986,585 | 1/1935 | Kroll | 75—170 |
| 2,005,423 | 6/1935 | Hunter | 75—170 |

HYLAND BIZOT, *Primary Examiner.*

R. O. DEAN, *Assistant Examiner.*